(12) United States Patent
Helms

(10) Patent No.: US 6,971,534 B1
(45) Date of Patent: Dec. 6, 2005

(54) DISPOSABLE OIL FILTER COVER

(76) Inventor: Scott G. Helms, 60920 Walnut Farms Ct., South Bend, IN (US) 46614

(*) Notice: Subject to any disclaimer, the term of this patent is extended or adjusted under 35 U.S.C. 154(b) by 0 days.

(21) Appl. No.: 10/698,107

(22) Filed: Oct. 31, 2003

Related U.S. Application Data

(60) Provisional application No. 60/423,158, filed on Nov. 1, 2002.

(51) Int. Cl.[7] ............................................. B65D 45/00
(52) U.S. Cl. ..................... 220/327; 210/184
(58) Field of Search .............. 220/327, 328, 220/325, 203.22; 210/184–186, 238, 541, 210/542, 443

(56) References Cited

U.S. PATENT DOCUMENTS

| | | | | |
|---|---|---|---|---|
| 969,776 A | * | 9/1910 | Foley ........................ | 137/371 |
| 969,881 A | * | 9/1910 | Klemm ...................... | 137/371 |
| 1,761,932 A | * | 6/1930 | Nutt .......................... | 220/251 |
| 3,858,612 A | * | 1/1975 | Van Steenburg ............ | 138/89 |
| 4,338,189 A | * | 7/1982 | Johnson, Sr. ............... | 210/180 |
| 4,493,344 A | * | 1/1985 | Mathison et al. ............ | 138/89 |
| 4,659,466 A | * | 4/1987 | Farr et al. ................... | 210/238 |
| 5,329,971 A | * | 7/1994 | Condon ...................... | 138/89 |
| 5,697,602 A | * | 12/1997 | Guerra Cisneros et al. . | 220/328 |
| 6,725,468 B2 | * | 4/2004 | Molina ....................... | 4/252.1 |

* cited by examiner

*Primary Examiner*—Lien M. Ngo
(74) *Attorney, Agent, or Firm*—Botkin & Hall LLP

(57) ABSTRACT

A cover for a disposable oil filter. The cover includes a flexible insert for inserting into the flow hole of the oil filter, a cover plate fitting around the insert for pressing against the oil filter seal, and a fastener for retaining the plate against the filter seal. The insert includes a flexible head which may be pressed through the filter flow hole but which will prevent the insert from pulling back through the flow hole. The fastener is used to clamp the cover plate against the filter seal.

2 Claims, 2 Drawing Sheets

DISPOSABLE OIL FILTER COVER

CROSS REFERENCE TO RELATED APPLICATIONS

This application is a continuation of Provisional U.S. Patent Application No. 60/423,158, filed Nov. 1, 2002, and claims the benefit of the filing date thereof.

BACKGROUND OF THE INVENTION

1. Field of the Invention

The invention disclosed herein relates to a disposable cover for disposable oil filter such as commonly used in internal combustion engines.

2. Discussion of Background Art

Internal combustion engines such as frequently found in automobiles normally include an oil system for lubrication that includes a filter for filtering debris from the oil. It is common for this oil filter to be disposable. A used disposable oil filter when removed from the engine contains waste oil, which often contains toxic materials. It is desirable to prevent the toxic used oil from becoming disbursed into the environment. It is common practice therefore, to collect the used oil from the used oil filter so that it can be recycled or otherwise properly disposed of.

A problem with reclaiming the used oil contained within an oil filter, however, is that it can take a very long time to drain all or almost all of the oil from the filter. Therefore, it is often unsuitable for the person changing the oil at its primary point of collection to collect all the used oil from the used oil filters. This can result in used oil filters being disposed of which still contain used oil. This situation can present a potentially negative influence on the environment. Therefore, it would be desirable to have a convenient way to contain any un-reclaimed used oil within the disposable oil filter until the used oil can be properly collected and disposed of.

SUMMARY OF THE INVENTION

A disposable cover for an oil filter includes a cover plate and a clamp device. The cover plate covers a flow hole in the oil filter and the seal around the flow hole. The clamp device presses the cover plate against the seal to prevent entrapped oil in the filter from escaping.

It is an object of the invention disclosed herein to provide a convenient apparatus for sealing any residual used oil within a disposable oil filter canister until the canister is reopened for future oil reclamation.

BRIEF DESCRIPTION OF THE DRAWINGS

These and other aspects of the invention will be apparent from the following description, with reference to the accompanying drawings, in which.

DETAILED DESCRIPTION

Figure 1:
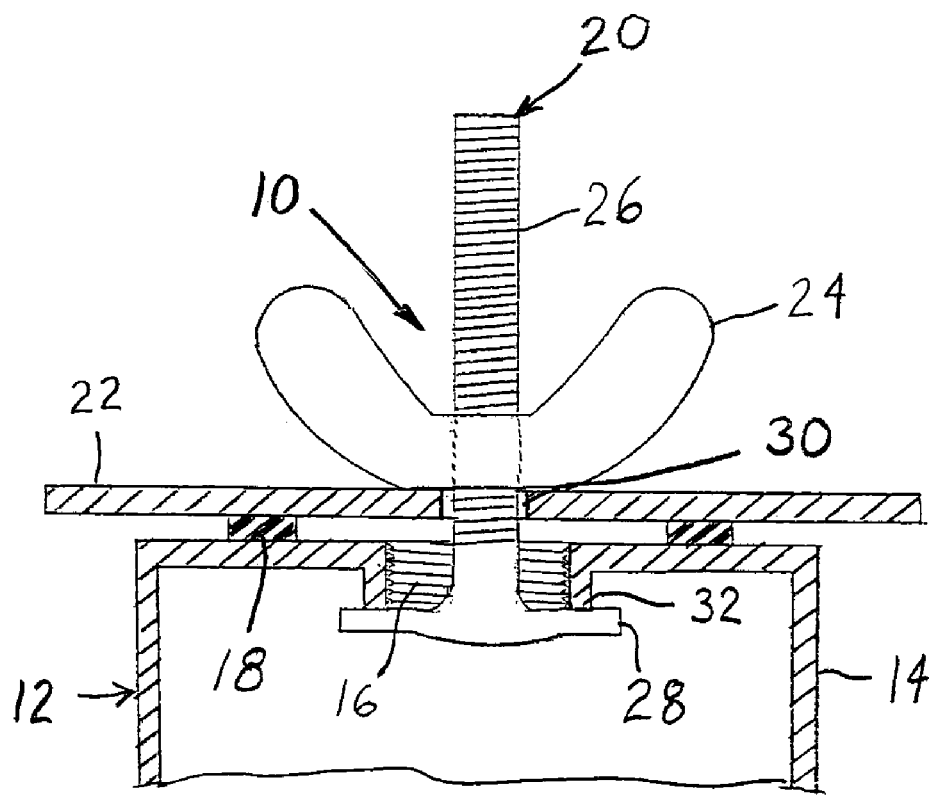
FIG. 1 is a partial cross sectional view of an oil filter cover clamped in its sealed position onto a disposable oil filter.
Figure 2:
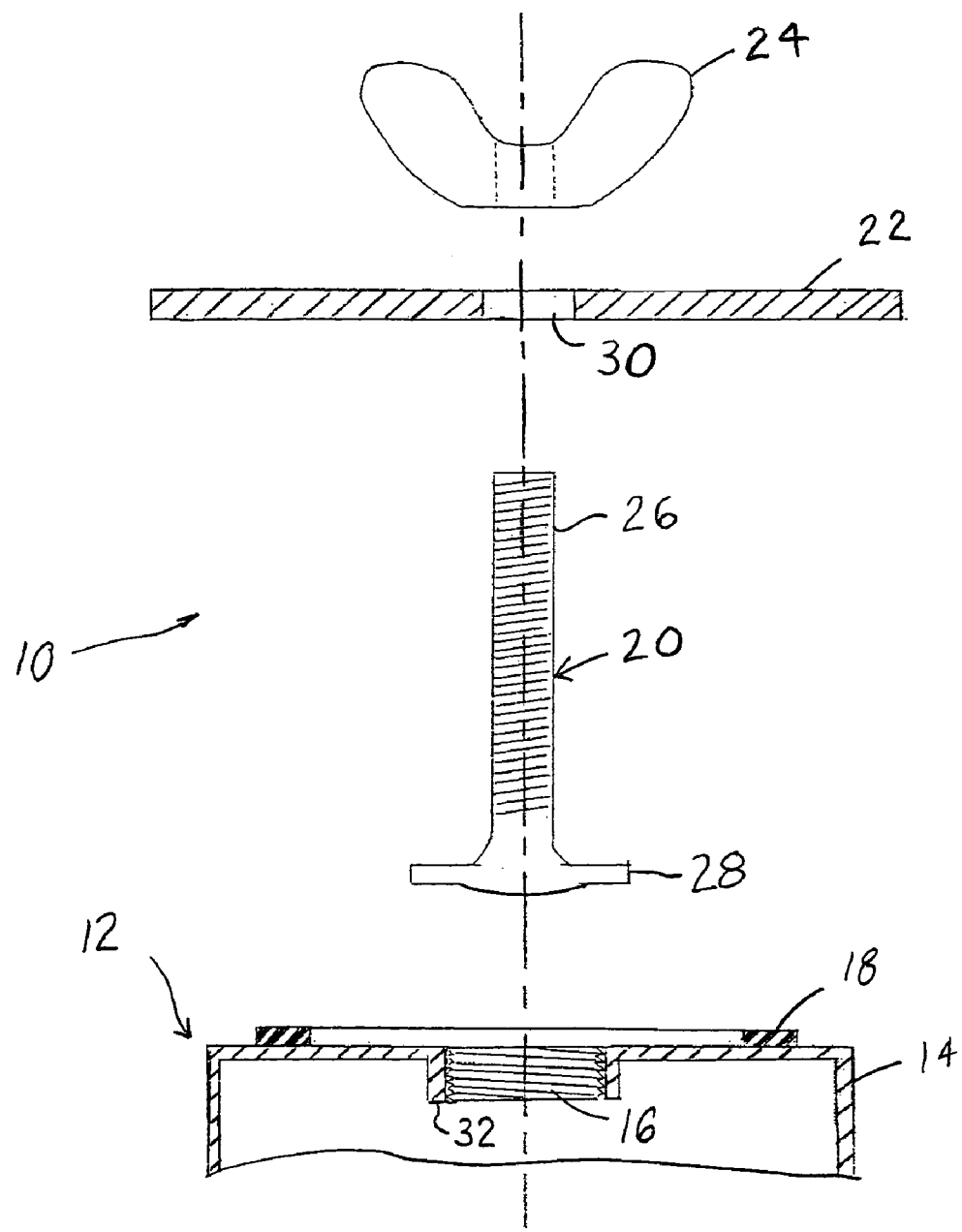
FIG. 2 shows the oil filter cover in its unassembled form in relation to a disposable oil filter.

Referring now to the drawings, a filter cover 10 is used to seal a canister type disposable oil filter 12 to prevent any used oil within the oil filter from escaping. Oil filter 12 is of the type generally having an encasing canister 14 with a flow hole 16 and a seal 18 about the flow hole. Filter cover 10 includes a flexible insert 20, a cover plate 22, and a fastener 24.

Flexible insert 20 includes a threaded shaft 26 and a head section 28. Head section 28 is sized slightly larger than hole 16 and made of flexible shape-retaining material so that it can be forcibly inserted through hole 16 where it can expand into an interference fit. Shaft 26 is rigid enough to allow fastener 24 to be attached to the shaft. Shaft 26 and head section 28 are preferably made of the same material, a molded plastic, for ease of construction. In that event, the required rigidity or flexibility of shaft 26 and head section 28 are controlled by the thickness and shape of each section. Other known configurations and combinations of materials for providing the necessary flexibility of head section 28 and the necessary rigidity of shaft 26 could also be used.

Cover plate 22 has a centrally located hole 30 sized to fit closely about shaft 26 of insert 20. Cover plate 22 is sized to cover seal 18 and is rigid enough to be clamped over seal 18 with fastener 24. Preferably, cover plate 22 is made of paper fiber board with an impervious film, such as a plastic coating, on the side facing flow hole 16 and seal 18 to prevent any oil contained within the filter from unduly softening the cover plate. Of course, other materials that are suitably stiff and liquid impervious could also be used, such as for example plastic, metal, or wood.

Fastener 24, preferably a wing nut made of molded plastic, is used to clamp cover plate against seal 18 over flow hole 16. Fastener 24 is threaded so that it may be turned onto shaft 26 of flexible insert 20. Other types of fasteners that could provide the necessary fastening action could also be used, such as, for example, a clamp mechanism.

To install filter cover 10 onto oil filter 12, head 28 of flexible insert 20 is pressed through hole 16 in canister 14. When head 28 is completely inside canister 14 past hole 16, hole cover plate 22 is pressed against seal 18 with shaft 26 extending outwardly from hole 30. Fastener 24 is then turned down threaded shaft 26 to sealingly press cover plate 22 against the seal 18. In this manner fastener 24 retains cover plate 22 over flow hole 16 to prevent any oil within canister 14 from escaping. Fastener 24 seats about hole 30 in cover 22 to seal the hole against seepage of oil from the canister. Head 28 of flexible insert 20 also provides a secondary oil seal by pressing against the inner lip 32 of canister flow hole 16. Filter cover 10 may later be removed by disengaging fastener 24 and removing cover plate 22, thereby allowing entrapped oil within canister 14 to be collected.

The detailed description related herein is only meant to exemplify the preferred embodiment of the invention to enable those skilled in the art to make and use it. The subject invention is not to be limited to the details given above for the preferred embodiment, but may be modified within the scope of the impending claims.

I claim:

1. A disposable cover for an oil filter; said filter including a canister for containing oil, said canister having a flow hole with a seal surrounding the flow hole; said cover comprising a cover plate and a clamp device; said cover plate for overlying said flow hole in engagement against said seal, said clamp device extending through said cover plate for engagement with said canister to compress the cover plate against said seal; said clamp device including a threaded bolt and a threaded nut; said nut turned onto said bolt; said bolt including a flexible head larger than said flow hole and being forced fittable through the flow hole into said canister; said cover plate having a hole; said bolt protruding through said hole in said cover plate with said cover plate located between said nut and said head.

2. The disposable cover of claim 1 wherein said bolt is made of molded plastic.

* * * * *